United States Patent [19]
Lee

[11] Patent Number: 5,293,019
[45] Date of Patent: Mar. 8, 1994

[54] AUTOMATIC COOKING APPARATUS AND METHOD FOR MICROWAVE OVEN

[75] Inventor: In K. Lee, Kyungsangnam, Rep. of Korea

[73] Assignee: Goldstar Co., Ltd., Seoul, Rep. of Korea

[21] Appl. No.: 913,360

[22] Filed: Jul. 15, 1992

[30] Foreign Application Priority Data

Jul. 15, 1991 [KR] Korea .................................. 12058

[51] Int. Cl.$^5$ .............................................. H05B 6/68
[52] U.S. Cl. ..................................... 219/708; 99/325
[58] Field of Search ................ 219/10.55 B, 10.55 M, 219/10.55 E, 10.55 F; 426/241, 243; 99/451, DIG. 14, 325

[56] References Cited

U.S. PATENT DOCUMENTS

| | | | |
|---|---|---|---|
| 4,210,795 | 7/1980 | Lentz | 219/10.55 B |
| 4,814,570 | 3/1989 | Takizaki | 219/10.55 B |
| 4,831,239 | 5/1989 | Ueda | 219/10.55 B |
| 4,926,020 | 5/1990 | Atwell et al. | 219/10.55 M |
| 4,943,697 | 7/1990 | Buckholz, Jr. et al. | 219/10.55 B |
| 5,036,172 | 7/1991 | Kokkeler et al. | 219/10.55 M |

FOREIGN PATENT DOCUMENTS

| | | |
|---|---|---|
| 0029483 | 6/1981 | European Pat. Off. . |
| 0289000 | 11/1988 | European Pat. Off. . |
| 0294872 | 12/1988 | European Pat. Off. . |
| 0359976 | 3/1990 | European Pat. Off. . |
| 2-306025 | 12/1990 | Japan .................. 219/10.55 E |
| 2117925 | 10/1983 | United Kingdom . |

*Primary Examiner*—Philip H. Leung
*Attorney, Agent, or Firm*—Birch, Stewart, Kolasch & Birch

[57] ABSTRACT

An automatic cooking apparatus and method for a microwave oven includes the steps of determining the type of food to be cooked, on the basis of a specific dielectric constant and dielectric power factor of the food by one-touch of the user, and performing automatic cooking of the food according to that determination. The apparatus includes a microwave energy sensor for sensing remaining microwave energy other than microwave energy absorbed into the food in a heating chamber. An electrical signal corresponding to the sensed microwave energy is generated in a microwave energy detection circuit, which then supplies its output signal to a control section. Also included therein is a weight sensor for sensing the weight of the food. An electrical signal corresponding to the sensed weight is generated in a weight detection circuit, which then supplies the weight signal to the control section. The control section calculates the specific dielectric constant and dielectric power factor of the food in response to a plurality of key signals outputted from a keyboard, the weight sense signal and the microwave energy sense signal, determines a heating time period of the food in accordance with the calculated results and controls the automatic cooling of the food in accordance with the determined heating time period of the food.

12 Claims, 4 Drawing Sheets

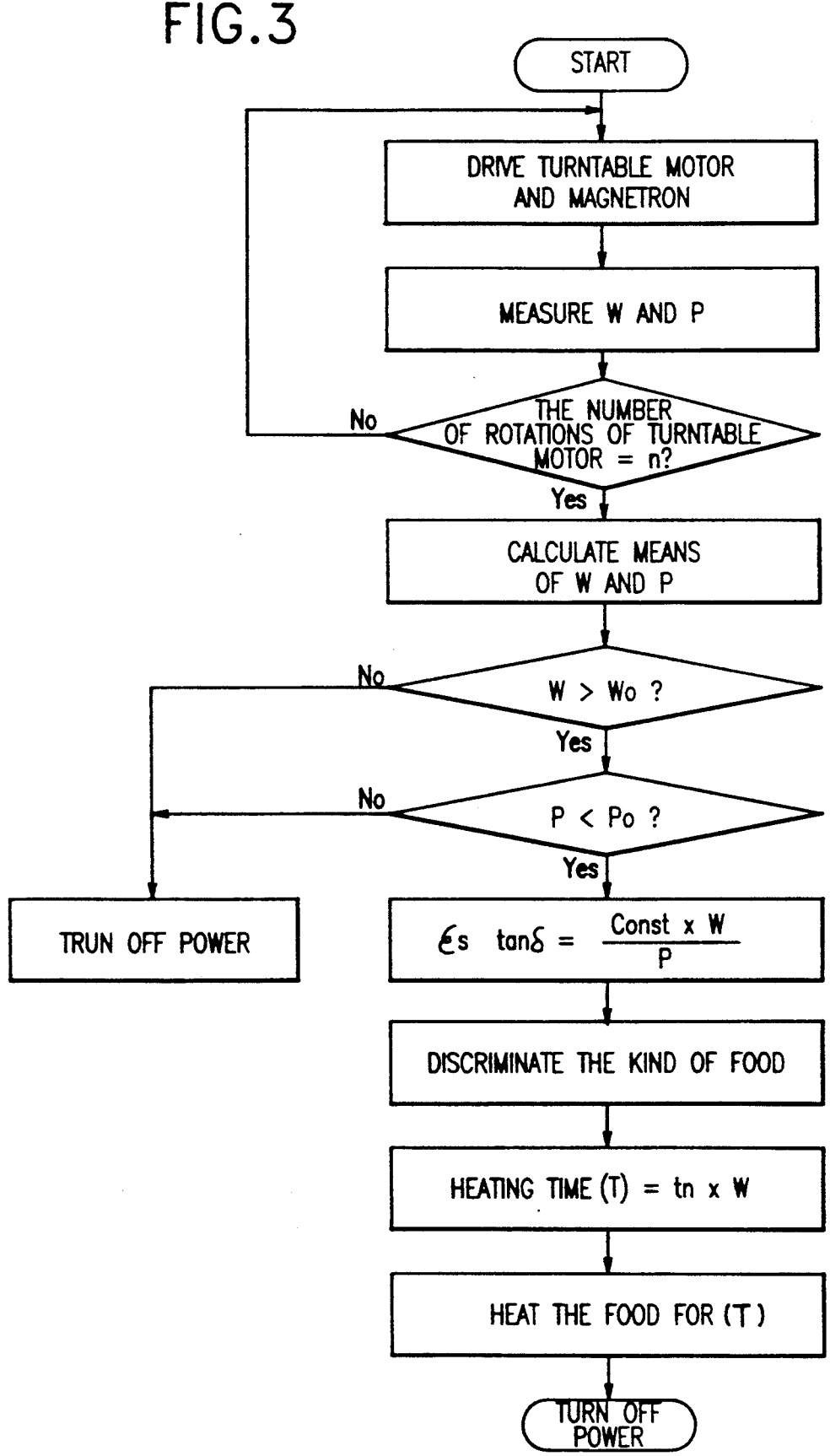

FIG. 4

| MATERIAL | SPECIFIC DIELECTRIC CONSTANT ($\varepsilon_s$) | DIELECTRIC POWER FACTOR $\tan\delta$ ($\times 10^{-4}$) |
|---|---|---|
| AIR (0°C, 1atm) | 1.0 | 1 |
| WATER (5°C, 3000MHz) | 80.2 | 2750 |
| BEEF (4.4°C, 3000MHz) | 8.3 | 2080 |
| VINYL CHLORIDE (ROOM TEMPERATURE, 1MHz) | 2.3~4.5 | 90~1400 |
| POLYETHYLENE (ROOM TEMPERATURE, 1MHz) NYLON (ROOM TEMPERATURE, 1MHz) | 2.2~2.4 4.0~4.7 | 5 OR MORE 400~1300 |
| PHENOL RESIN (ROOM TEMPERATURE, 1MHz) | 4.0~5.5 | 150~500 |
| EPOXY RESIN (ROOM TEMPERATURE, 1MHz) | 3.3~4.0 | 300~500 |
| SILICONE RESIN (ROOM TEMPERATURE, 1MHz) | 4.6~5.5 | 350~450 |
| NATURAL RUBBER (ROOM TEMPERATURE, 1MHz) | 2.9 | 450 |
| SODIUM CARBONATE GLASS (ROOM TEMPERATURE, 1MHz) | 6.0~8.0 | 100 OR LESS |
| PYREX GLASS (ROOM TEMPERATURE, 1MHz) (BORIC ACID GLASS) | 4.0~5.0 | 5~30 |
| KAOLINE (ROOM TEMPERATURE, 1MHz) | 6.0~7.0 | 100~150 |

AUTOMATIC COOKING APPARATUS AND METHOD FOR MICROWAVE OVEN

FIELD OF THE INVENTION

The present invention relates in general to determination of the type of food to be cooked, and automatic cooking of the food on the basis of that determination in a microwave oven, and more particularly to an automatic cooking apparatus and method for a microwave oven for determining the type of food to be cooked on the basis of calculation of a specific dielectric constant and a dielectric power factor of the food by one-touch of the user, and performing automatic cooking of the food according to that determination.

BACKGROUND OF THE INVENTION

An example of a conventional automatic cooking apparatus for a microwave oven on the basis of a determination of the type of food is shown in U.S. Pat. No. 4,831,239, issued May 16, 1989, and the arrangement thereof is shown in block form in FIG. 1 herein. As shown in FIG. 1, the conventional automatic cooking apparatus comprises a heating chamber 3 for containing food 4, to be cooked, for heating thereof for heating thereof, a turntable 5 disposed in the heating chamber 3, and on the bottom thereof, a turntable motor 6 placed below the heating chamber 3 for rotating the turntable 5, a weight sensor 7 is disposed below the turntable motor 6 for sensing the weight of the food 4, a weight detection circuit 8 is provided for generating an electrical signal corresponding to the weight of the food 4 sensed by the weight sensor 7, and a magnetron 9 is placed on the top of the heating chamber 3 for radiating microwave energy into the heating chamber 3, a cooling fan 10 is disposed at one side of the magnetron 9 for blowing cooling air to cool the magnetron 9, and an intake guide 12 is disposed at the other side of the magnetron 9 on top of the heating chamber 3 for introducing a part of the cooling air blown from the cooling fan 10 into the heating chamber 3, an exhaust guide 14 is placed on a side wall of the heating chamber 3 for exhausting vapor and various gases generated from the heated food 4 in the heating chamber 3 to the outside, and a gas sensor 15 is provided in the exhaust guide 14 for sensing the amount of the vapor and gases being exhausted to the outside, a gas detection circuit 16 is provided for generating an electrical signal corresponding to the amount of vapor and gases sensed by the gas sensor 15, and an ultrasonic sensor 17, is provided on the ceiling of the heating chamber 3 for transmitting an ultrasonic wave toward the food 4 and receiving an echo wave returning therefrom to measure the distance to the food 4, a drive and detection circuit 18 is provided for driving the ultrasonic sensor 17 and generating an electrical signal corresponding to the distance to the food 4 measured by the ultrasonic sensor 17, and an automatic cooking control section 1 is provided for determining the of food 4 on the basis of the detected values from the drive and detection circuit 18, the weight detection circuit 8 and the gas detection circuit 16, and for controlling the automatic cooking of the food 4 in accordance with determined type of the food 4, a driver 13 is provided for driving the magnetron 9 and the turntable motor 6 under the control of the automatic cooking control section 1, and a keyboard 2 is provided for providing key inputs to the automatic cooking control section 1.

The operation of the conventional automatic cooking apparatus with the above-mentioned construction will now be described.

In operation, when the user turns on the microwave oven, places the food 4 to be cooked on the turntable 5 in the heating chamber 3 and operates keys of the keyboard 2 to start the automatic cooking of the food 4, the control section 1 starts the automatic cooking control.

That is, the control section 1 actuates the driver 13 to drive the turntable motor 6, in response to a cooking start signal which was input through the keyboard 2. The turntable 5 is rotated according to the driving of the turntable motor 6. At this time, the weight sensor 7 senses the weight of the food 4 and an electrical signal corresponding to the sensed weight is generated in the weight detection circuit 8, which then supplies the weight signal to the control section 1 as cooking information.

At the same time, the control section 1 controls the drive and detection circuit 18 to energize the ultrasonic sensor 17, so that the ultrasonic sensor 17 emits the ultrasonic wave to the food 4 placed on the turntable 5 to measure the distance to the food 4 by reception of an echo wave returning from the surface of the food 4. The distance d from the surface of the food 4 to the ultrasonic sensor 17 is determined on the basis of a time difference between the transmission and reception of the ultrasonic wave, and signal indicative of the distance data is supplied from the drive and detection circuit 18 to the control section 1.

In the control section 1, the weight W of the food 4 is calculated according to the weight detected signal from the weight detection circuit 8, and the height h thereof is calculated by subtracting the distance from the distance H between the ultrasonic sensor 17 and the top surface of the turntable 5. Namely, the height h of the food 4 is obtained as $h = H - d$.

Then, in the control section 1, the volume V of the food 4 is determined on the basis of the calculated height h, and the density D is calculated on the basis of the determined volume V and weight W. Namely, the density D of the food 4 positioned on the turntable 5 is obtained as $D = W/V$.

Accordingly, the control section 1 determines the type of food 4 on the basis of the calculated density D of the food 4 and performs the automatic cooking control in accordance with that determination. Namely, the control section 1 pre-stores, in the form of a look-up table in its memory, appropriate automatic cooking control values (heating time periods) corresponding to the densities of various foods and, with the density of the food to be cooked calculated, reads the automatic cooking control value corresponding to the calculated density of the food from the pre-stored look-up table in its memory and performs the automatic cooking control on the basis of the read value read.

In accordance with the determination of the type of food 4 to be cooked, the control section 1 actuates the driver 13 on the basis of the corresponding automatic cooking control value, thereby causing the magnetron 9 to be driven to heat the food 4. The turntable motor 6 is also driven by the driver 13 and the turntable 5 is rotated according to the driving of the turntable motor 6. As a result, the food 4 is heated, while being rotated with the rotation of the turntable 5.

In response to the heating, the cooling fan 10 is driven to cool the magnetron 9 and the cooling air is introduced through the intake guide 12 into the heating chamber 3 which is in turn ventilation. After ventilated, the introduced air is exhausted through the exhaust guide 14 to the outside. The gas sensor 15 provided in the exhaust guide 14 senses the vapor and various gases generated from the heated object 4. The gas data from the gas sensor 15 is supplied through the gas detection circuit 16 to the control section 5. As a result, the control section 1 determines a cooking completion point of time on the basis of the gas data from the gas detection circuit 16 and completes the automatic cooking control operation at that time.

However, the above-mentioned conventional automatic cooking apparatus for the microwave oven has a disadvantage, in that the height of the food placed on the turntable is measured with the rotation thereof. In other words, the accurate measurement of the food height is difficult because of unreliability in the transmission and reception of the ultrasonic wave depending on the surface conditions of the food. Also, the control section is required to have high-performance operating ability, since the volume of the food must be determined on the basis of the measured height thereof and the density thereof must be calculated on the basis of the determined volume and weight thereof, eventhough the height of the food has been measured accurately. This requirement results in an increase in the cost of products.

Moreover, since the heating time period is determined only on the basis of the calculated density regardless of whether the food to be cooked is in the single or mixed form, a half-done or over-done case may occur in the mixed form of the food.

Further, an error in the calculated volume of the food and therefore an error in the calculated density thereof may occur due to a container placed on the turntable to contain the food. Also in calculating the density of food containing a large amount of water, there may occur a wide error due to different weights depending on the amount of contained water. These errors cause misrecognition of the type of food, thereby resulting in the erroneous automatic cooking control operation.

As a result, in the above-mentioned conventional automatic cooking apparatus for the microwave oven, the misrecognition of the food type and the resulting erroneous automatic cooking control operation occur frequently, resulting in decreased reliability of cooking according to the automatic control.

SUMMARY OF THE INVENTION

Therefore, it is an object of the present invention to provide an automatic cooking apparatus and method for a microwave oven for calculating specific dielectric constant and dielectric power factor which are inherent to type of food, with the use of a microwave energy sensor and a weight sensor, determining the type of food to be cooked on the basis of the calculated results, and controlling automatic cooking of the food according to that determination, so that accuracy in determination can be increased, thereby resulting in improved reliability of cooking according to the automatic control.

In accordance with one aspect of the present invention, there is provided an automatic cooking apparatus for a microwave oven, comprising: a magnetron for radiating microwave energy through a waveguide into a heating chamber; a turntable disposed on the bottom of said heating chamber and arranged to be rotatable about its own axis; a turntable motor placed below the heating chamber for rotating the turntable; a weight sensing member for sensing the weight of food placed on the turntable to be cooked and outputting a weight sense signal corresponding to the sensed weight of the food; a microwave energy sensing member for sensing the microwave energy in the heating chamber and outputting a microwave energy sense signal corresponding to the sensed microwave energy; a control member for calculating the specific dielectric constant and dielectric power factor of the food in response to a plurality of key signals outputted from a keyboard, the weight sense signal from the weight sensing member and the microwave energy sense signal from the microwave energy sensing member, for determining a heating time period of the food in accordance with the calculated results, and for controlling the automatic cooking of the food in accordance with the determined heating time period of the food; and a driver for driving the magnetron and the turntable motor under the control of the control member.

In accordance with another object of the present invention, there is provided an automatic cooking method for a microwave oven, comprising the steps of: driving a magnetron and a turntable motor upon input of an automatic cooking start key and then measuring the weight of a food to be cooked and microwave energy in a heating chamber for a predetermined period of time until the number of rotations of the turntable motor equals a predetermined number of rotations; calculating the average weight of the food and the microwave energy levels measured for the predetermined period of time; calculating the specific dielectric constant and dielectric power factor of the food on the basis of the calculated averages of the food weights and the microwave energy levels and determining the type of food in accordance with the calculated results; and selecting a heating period of time corresponding to the determined type of food, heating the food for the selected heating time period and then completing the automatic cooking by turning off power.

BRIEF DESCRIPTION OF THE DRAWINGS

The above and other objects, features and advantages of the present invention will be more clearly understood from the following detailed description taken in conjunction with the accompanying drawings, in which:

FIG. 3 is a flowchart illustrating the operation of the automatic cooking apparatus in FIG. 2 in accordance with the present invention; and FIG. 4 is a table illustrating specific dielectric constant and dielectric power factor which are inherent to every type of food.

DETAILED DESCRIPTION OF THE PREFERRED EMBODIMENTS

Figure 1:
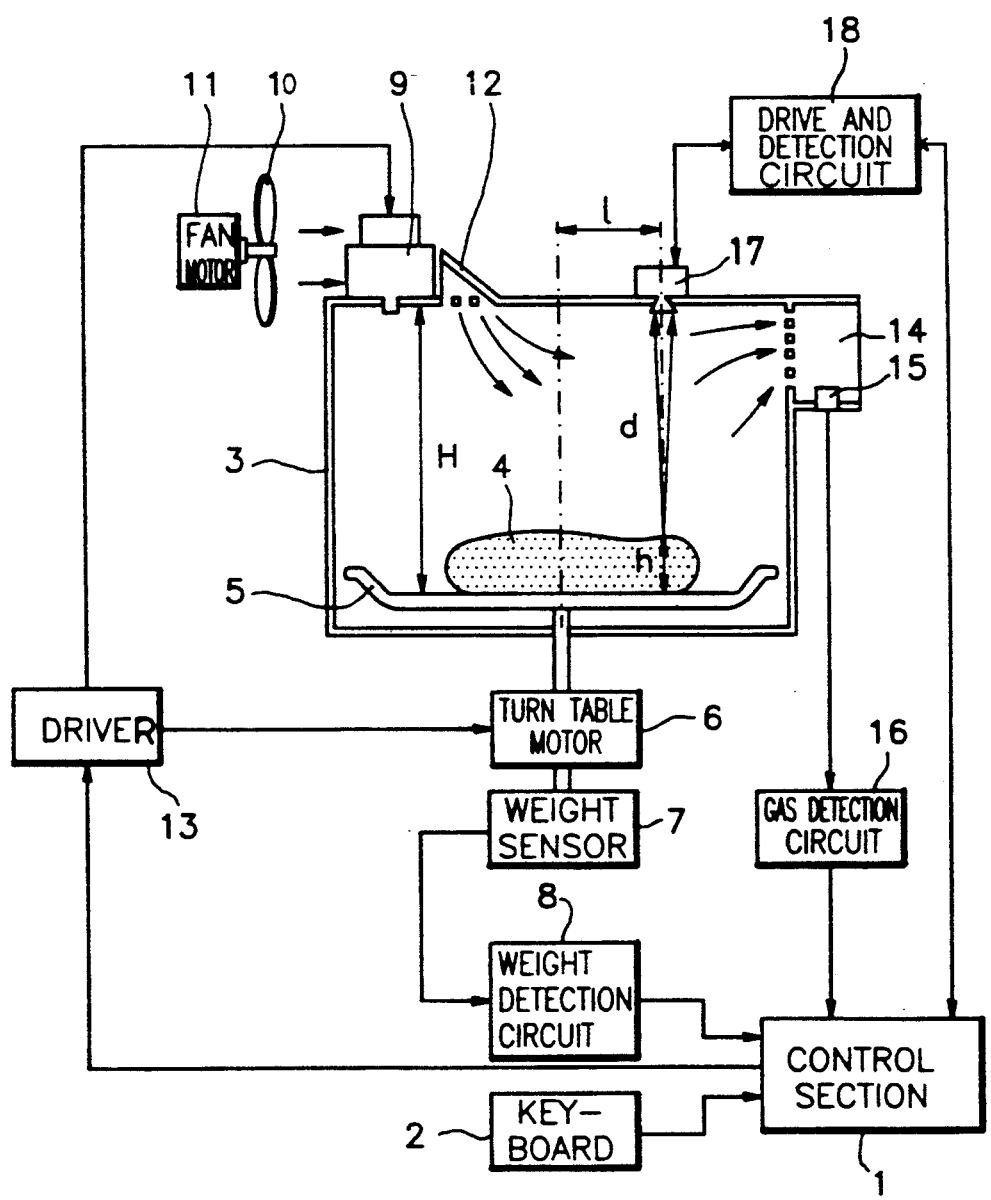
FIG. 1 is a block diagram of a conventional automatic cooking apparatus for a microwave oven.
Figure 2:
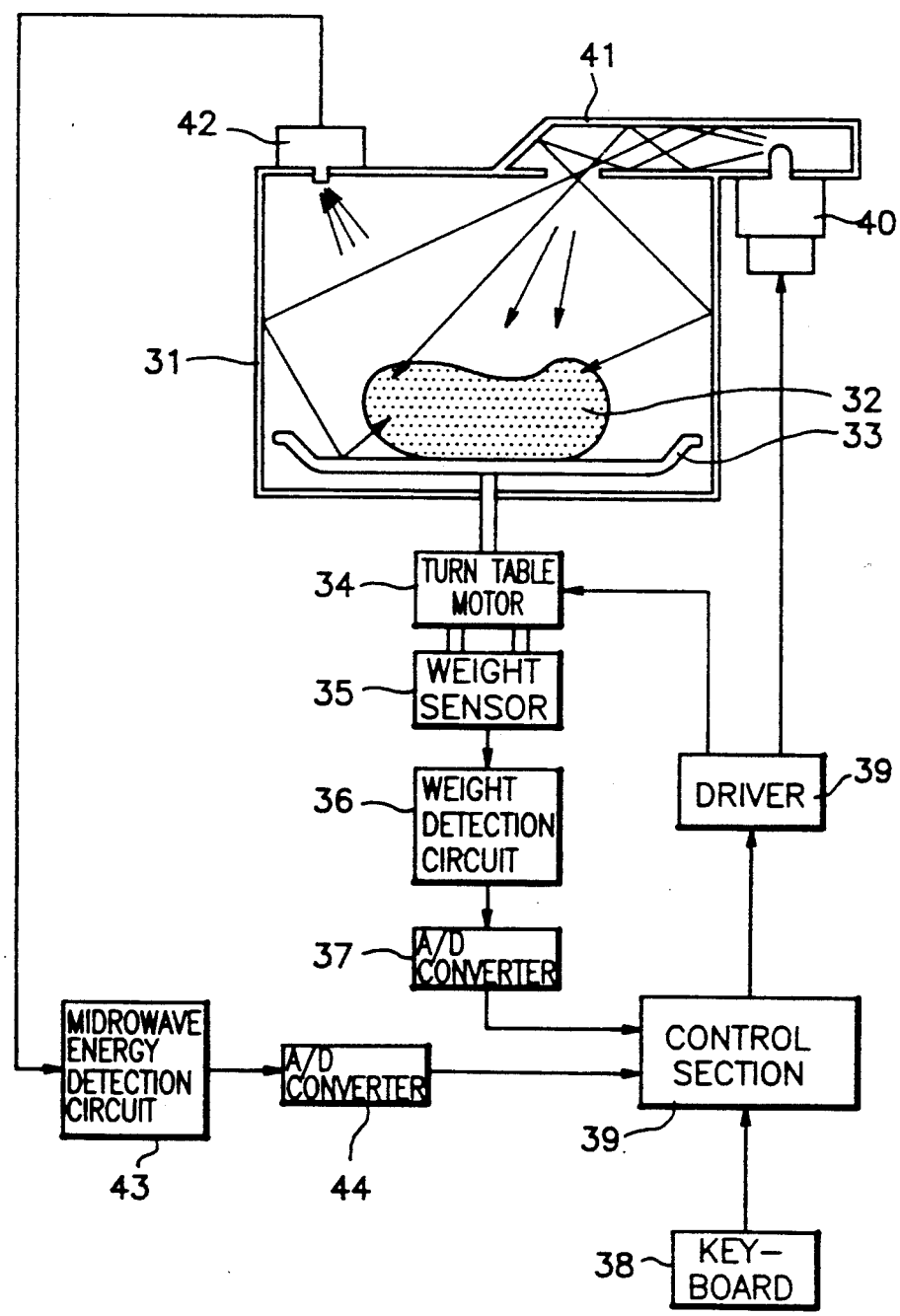
FIG. 2 is a block diagram of an automatic cooking apparatus for a microwave oven in accordance with the present invention.

Referring to FIG. 2, there is shown, in block form, an arrangement of an automatic cooking apparatus for a microwave oven in accordance with the present invention. As shown in FIG. 2, the automatic cooking apparatus of the present invention comprises a magnetron 40 for radiating microwave energy through a waveguide 41 into a heating chamber 31, a turntable 33 disposed in the heating chamber 31 and on the bottom thereof and arranged to be rotatable about its own axis, a turntable motor 34 placed below the heating chamber 31 for rotating the turntable 33, a weight sensor 35 disposed below the turntable motor 34 for sensing the weight of a food 32 placed on the turntable 33 to be cooked, a weight detection circuit 36 for generating an electrical signal corresponding to the weight of the food 32 sensed by the weight sensor 35, a first analog/digital converter 37 for converting an output signal from the weight detection circuit 36 into a digital signal, a microwave energy sensor 42 provided on the ceiling of the heating chamber 31 for sensing the microwave energy in the heating chamber 31, a microwave energy detection circuit 43 for generating an electrical signal corresponding to the microwave energy sensed by the microwave energy sensor 42, a second analog/digital converter 44 for converting an output signal from the microwave energy detection circuit 43 into a digital signal, an automatic cooking control section 30 for determining the type of food 32 in response to a plurality of key signals outputted from a keyboard 38 and on the basis of the detected weight and microwave energy level from the first and second analog/digital converters 37 and 44 and controlling the automatic cooking of the food 32 in accordance with the determined type of food 32, and a driver 39 for driving the magnetron 40 and the turntable motor 34 under the control of the automatic cooking control section 30. In FIG. 2, because the arrangement of general parts corresponding to FIG. 1 such as, for example, an intake guide, an exhaust guide, a cooling fan and etc. can be understood from the foregoing description of FIG. 1, drawing and description thereof have been omitted for simplicity.

Now, the operation of the automatic cooking apparatus with the above-mentioned construction in accordance with the present invention will be described in detail with reference to FIG. 3, which is a flowchart illustrating the operation of the automatic cooking apparatus in FIG. 2 in accordance with the present invention.

When the user turns on the microwave oven, places the food 32 to be cooked on the turntable 33 in the heating chamber 31 and pushes an automatic cooking start key on the keyboard 38 to start the automatic cooking of the food 32, the control section 30 performs the automatic cooking control as shown in FIG. 3.

In operation, first, the control section 30 performs a first step of driving the magnetron 40 and the turntable motor 34 through the driver 39 upon input of the automatic cooking start key and then measuring the weight W of the food 32 to be cooked and the microwave energy P in the heating chamber 31 for a predetermined period of time until the number of rotations of the turntable motor 34 is in accord with a predetermined number of rotations.

At the first step, with the magnetron 40 being driven through the driver 39 under the control of the control section 30, microwave energy is generated in the magnetron 40 and radiated through the waveguide 41 into the heating chamber 31. Most of the microwave energy radiated into the heating chamber 31 is absorbed into the food 32 to heat it and the remainder is reflected or lost in the heating chamber 31. At this time, the microwave energy sensor 42 senses the remaining microwave energy P other than the microwave energy absorbed into the food 32 in the heating chamber 31 and an electrical signal corresponding to the sensed microwave energy is generated in the microwave energy detection circuit 43, which then supplies its output signal to the second analog/digital converter 44. The second analog/digital converter 44 converts the output signal from the microwave energy detection circuit 43 into a digital signal and then supplies it to the control section 30.

On the other hand, at the first step, when the turntable motor 34 is driven through the driver 39 under the control of the control section 30, the turntable 33 is rotated according to the driving of the turntable motor 34, thereby enabling the food 32 to be heated uniformly. At this time, the weight sensor 35 provided below the turntable motor 34 senses the weight W of the food 32 and an electrical signal corresponding to the sensed weight W is generated in the weight detection circuit 36, which then supplies its output signal to the first analog/digital converter 37. The first analog/digital converter 37 converts the output signal from the weight detection circuit 36 into a digital signal and then supplies it to the control section 30.

The measurements of the food 32 weight W and the remaining microwave energy P other than the microwave energy absorbed into the food 32 in the heating chamber 31 are continuously performed under the control of the control section 30 for a predetermined period of time until the number of rotations of the turntable motor 34 is in accord with a predetermined number of rotations n. When the number of rotations of the turntable motor 34 is in accord with the predetermined number of rotations n, the control section 30 calculates the averages of the weights W of the food 32 and the microwave energy levels P sensed for the predetermined period of time, at a second step. Noticeably, although the weights of the food 32 and the microwave energy levels in the heating chamber 31 sensed for the predetermined period of time has been designated respectively as W and P, the calculated averages thereof will hereinafter be designated respectively as weight W and microwave energy P, equally.

Then, the control section 30 performs a system no-load discriminating operation at a third step. First at the third step, the weight W of the food 32 is compared with the minimum weight Wo for the system no-load discrimination. If the weight W of the food 32 is less than or equal to the minimum weight Wo as a result of the comparison, the system is in no-load. As a result, the magnetron 40 and the turntable motor 34 are stopped and the power is turned off, so that automatic cooking is stopped. On the contrary, if the weight W of the food 32 is greater than the minimum weight Wo, the microwave energy P obtained at the second step is compared with the maximum microwave energy Po for the system no-load discrimination. If the microwave energy P obtained at the second step is greater than the maximum microwave energy Po as a result of the comparison, the power is turned off so that automatic cooking is stopped.

On the other hand, if the weight W of the food 32 obtained at the second step is greater than the minimum weight Wo and the microwave energy P obtained at the second step is less than or equal to the maximum microwave energy Po, the system are not in no-load. As a result, the specific dielectric constant and dielectric power factor of the food 32 is then calculated on the basis of the weight W of the food 32 and the microwave energy P obtained at the second step, at a fourth step.

In the case of heating the food material in a general microwave oven, microwave energy P1 absorbed per unit volume into the food material can be expressed by the following equation (1).

$$P1 = K1 \cdot E^2 \cdot f \cdot \epsilon \cdot \tan\delta \qquad (1)$$

where,
- P1: microwave energy absorbed per unit volume into the food material,
- K1: proportional constant,
- E: electric field intensity (constant in the same microwave ovens),
- f: microwave frequency (2,450 MHz),
- $\epsilon$: dielectric constant of the food material, and
- $\tan\delta$: dielectric power factor of the food material.

From the above equation (1), microwave energy P2 absorbed per unit weight into the food material can be expressed by the following equation (2).

$$P2 = K2 \cdot E^2 \cdot f \cdot \epsilon s \cdot \tan\delta \qquad (2)$$

where,
- P2: microwave energy absorbed per unit weight into the food material,
- K2: proportional constant, and
- $\epsilon s$: specific inductive capacity of the food material with respect to air.

It is noted herein that microwave energy P3 sensed per unit weight by the microwave energy sensor 42 becomes less and less in amount as the microwave energy P2 absorbed per unit weight into the food material becomes more and more in amount. Namely, the microwave energy P2 and the microwave energy P3 are in inverse proportion to each other. As a result, supposing that K3 is a proportional constant in consideration of the specific dielectric constant $\epsilon s$ of the food material with respect to air, the equation (2) can be substituted by the following equation (3).

$$\begin{aligned} P3 &= K3/P2 = 1/(K2 \cdot E^2 \cdot f \cdot \epsilon s \cdot \tan\delta) \\ &= K4/(E^2 \cdot f \cdot \epsilon s \cdot \tan\delta) \end{aligned} \qquad (3)$$

where,
- P3: microwave energy P3 sensed per unit weight by the microwave energy sensor 42,
- K3: proportional constant, and
- K4=K3/K2: proportional constant.

From the above equation (3), the relationship between the actual microwave energy $P_{sensing}$ (=P) sensed by the microwave energy sensor 42 and the weight W of the food material can be expressed by the following equation (4).

$$P3 = P_{sensing}/W = K4/(E^2 \cdot f \cdot \epsilon s \cdot \tan\delta) \qquad (4)$$

where,
- $P_{sensing}$: the actual microwave energy sensed by the microwave energy sensor 42 and
- W: weight of the food material.

Since K4=K3/K2 is a proportional constant which is experimentally obtained and E and f are constants which are determined on the basis of the oscillating output and frequency of the magnetron 40, respectively, it can be supposed that $K4/(E^2 \cdot f)$=Const. As a result, from the above equation (4), the specific dielectric constant and the dielectric power factor of the food material can be expressed by the following equation (5).

$$\begin{aligned} \epsilon s \cdot \tan\delta &= (K4 \cdot W)/(E^2 \cdot f \cdot P_{sensing}) \\ &= \text{Const} \cdot (W/P_{sensing}) \end{aligned} \qquad (5)$$

Therefore, with the constant Const being preselected by obtaining the constant K4 experimentally and obtaining $E^2 \cdot f$ on the basis of the electric field intensity and frequency of the magnetron 40, the control section 30 can calculate the specific dielectric constant $\epsilon s$ and the dielectric power factor $\tan\delta$ of the food 32 on the basis of the weight W of the food 32, the actual microwave energy $P_{sensing}$ sensed by the microwave energy sensor 42 and the constant Const.

With the specific dielectric constant $\epsilon s$ and the dielectric power factor $\tan\delta$ of the food 32 being obtained by the above equation (5) at the fourth step, the control section 30 performs a fifth step of determining the type of food 32 on the basis of the obtained specific dielectric constant $\epsilon s$ and dielectric power factor $\tan\delta$ of the food 32, calculating a heating period of time corresponding to that determination and completing the automatic cooking by turning off the power after the driving of the magnetron 40 for the calculated heating period of time.

Namely, since the specific dielectric constant $\epsilon s$ and dielectric power factor $\tan\delta$ are inherent to every material as shown in FIG. 4 the control section 30 determines the type of food 32 in accordance with the corresponding specific dielectric constant $\epsilon s$ and dielectric power factor $\tan\delta$, by pre-storing, in the form of a look-up table in its memory, the food types corresponding to the specific dielectric constant $\epsilon s$ and dielectric power factors $\tan\delta$ and retrieving the type of food 32 corresponding to the calculated specific dielectric constant $\epsilon s$ and dielectric power factor $\tan\delta$ from the pre-stored look-up table in its memory.

The control section 30 also pre-stores heating periods of time tn per unit weight corresponding to the food types, in the form of a look-up table in its memory. The heating period of time tn per unit weight is a period of time during which the food is heated per unit weight until a cooking completion point of time. As a result, the total heating time period T is calculated by retrieving the heating period of time tn per unit weight corresponding to the determined type of food 32 from the pre-stored look-up table in the memory and multiplying the heating period of time tn per unit weight by the weight (weight average) W of the food 32. That is, the total heating time period T of the food 32 is obtained as T=tn·W.

In this manner, selected in the pre-stored heating time table are the heating periods of time T corresponding to the kinds of the foods (i.e., $\epsilon s \cdot \tan\delta$ inherent to every food material). With the heating period of time T being selected as mentioned above, the magnetron 40 is driven for the selected heating period of time T, to heat the food 32 in the heating chamber 31 for that time period T. At this time, since the turntable 33 is being rotated according to the driving of the turntable motor 34, the food 32 can be heated uniformly. After the lapse of the heating time period T, the control section 30 turns off the driving power to the magnetron 40, the turntable motor 34, a fan motor (not shown) and displays the automatic cooking completion. As a result, the automatic cooking is completed.

On the other hand, in accordance with an alternative embodiment of the present invention, the automatic cooking may be performed by calculating the specific dielectric constant $\epsilon_s$ and dielectric power factor $\tan\delta$ of the food 32 to be cooked and calculating the heating time period T of the food 32 directly on the basis of the calculated specific dielectric constant $\epsilon_s$ and dielectric power factor $\tan\delta$, differently from that in the first embodiment.

More particularly, in accordance with the alternative embodiment of the present invention, the heating period of time, during which the food is heated per unit weight until the cooking completion point of time, is obtained experimentally for every food type on the basis of $\epsilon_s.\tan\delta$ inherent to every food type and is then pre-stored in the form of a look-up table in the memory of the control section 30. As a result, the total heating time period T is calculated by retrieving the heating period of time per unit weight corresponding to the specific dielectric constant $\epsilon_s$ and dielectric power factor $\tan\delta$ of the food 32 to be cooked from the pre-stored look-up table in the memory and multiplying the heating period of time tn per unit weight by the weight W of the food 32.

Therefore, in the alternative embodiment of the present invention, the food type determination step and thus the look-up table used for the food type determination in the first embodiment are not required. This enables the construction in the alternative embodiment to perform the automatic cooking more efficiently as compared with that in the first embodiment.

Also, in accordance with the preferred embodiments of the present invention, the control section 30 may comprise a known microcomputer with a central processing unit (CPU) and memories.

As hereinbefore described, according to the present invention, there are provided an automatic cooking apparatus and method for a microwave oven, which can perform automatic cooking by determining the heating period of time on the basis of the specific dielectric constant and dielectric power factor inherent to every food type and heating the food for the determined heating time period, so that the accuracy in the food type determination can be increased. Therefore, the increase in the accuracy of the food type determination can prevent erroneous automatic cooking from occurring in the microwave oven, thereby resulting in improvement in the quality and reliability of the microwave oven. Further, no-load cooking can be avoided in the microwave oven so that the possibility of a fire in the microwave oven can be avoided. This provides an increase in safety of the microwave oven.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic cooking method for a microwave oven comprising the steps of:
   subjecting food in the microwave oven to microwave energy;
   detecting continuously and during a predetermined time a microwave energy level not absorbed into the food and a weight of the food; calculating an average microwave energy level and an average weight of the food on the basis of said detection;
   calculating a relative dielectric constant and a dielectric factor of the food on the basis of said average microwave energy level and said average weight; and
   cooking the food in accordance with the calculated relative dielectric constant and dielectric factor.

2. An automatic cooking method for a microwave oven comprising the steps of:
   driving a magnetron and a turntable upon an input of an automatic cooking start key during a predetermined time, and continuously measuring a weight of a food to be cooked and a microwave energy level not absorbed into the food;
   calculating an average value of said microwave energy level and an average value of said weight of the food;
   calculating a relative dielectric constant and a dielectric factor of the food on the basis of said average microwave energy level and said average weight;
   identifying the food to be cooked in accordance with said relative dielectric constant and said dielectric factor, and obtaining a cooking time corresponding to the food; and
   cooking said food for said cooking time.

3. The automatic cooking method as claimed in claim 2, further comprising a no load protection step of
   turning off the magnetron if said average weight is less than a minimum weight preselected for the microwave oven, or said microwave energy level is greater than a maximum microwave energy level preselected for the microwave oven.

4. The automatic cooking method as claimed in claim 2, wherein said relative dielectric constant and said dielectric factor are calculated from an equation:

$$\epsilon_s \tan\delta = \text{Const.} \ (W/P_{sensing}),$$

where
   $\epsilon_s$ is the dielectric constant;
   $\tan\delta$ is the dielectric factor;
   W is the average weight;
   $P_{sensing}$ is the average microwave energy; and
   Const. is a constant.

5. The automatic cooking method as claimed in claim 4, wherein said constant Const. is determined from an equation:

$$\text{Const} \ K4/(E^2 \cdot f),$$

where
   E is an electric field intensity sensed by a microwave energy sensor;
   f is a frequency of said magnetron; and
   K4 is a proportional constant which is obtained experimentally.

6. An automatic cooking method as claimed in claim 2, wherein said cooking time is obtained by multiplying a cooking time per unit weight corresponding to said identified food by said average weight, said cooking time per unit weight being experimentally obtained for various kinds of food and stored in a memory means of the microwave oven.

7. An automatic cooking method for a microwave oven comprising the steps of:
   driving a magnetron and a turntable upon an input of an automatic cooking start key during a predetermined time while continuously measuring a weight of food to be cooked and a microwave energy level not absorbed into the food;

calculating an average value of said microwave energy level and an average value of said weight of the food;

calculating a relative dielectric constant and a dielectric factor of the food on the basis of said average microwave energy level and said average weight;

obtaining a cooking time of the food in accordance with said reactive dielectric constant and said dielectric factor; and cooking said food in accordance with said cooking time.

8. The automatic cooking method as claimed in claim 7, further comprising a no load protection step of turning off the magnetron if said average weight is less than a minimum weight preselected for the microwave oven, or said microwave energy level is greater than a maximum microwave energy level preselected for the microwave oven.

9. The automatic cooking method as claimed in claim 7, wherein said cooking time is obtained by multiplying a cooking time per unit weight corresponding to said relative dielectric constant and said dielectric factor of the food by said average weight, said cooking time per unit weight being experimentally obtained for various kinds of food and stored in a memory means of the microwave oven.

10. An automatic cooking apparatus for a microwave oven, comprising:

means for radiating microwave energy through a waveguide into a heating chamber;

a turntable means disposed on a bottom of the heating chamber, for rotating a food to be cooked within the heating chamber;

means for sensing a weight of food placed on the turntable for a predetermined time;

means for sensing a microwave energy level not absorbed into the food within said heating chamber for said predetermined time;

control means for calculating an average weight of the food and an average microwave energy level with respect to said predetermined time, calculating a relative dielectric constant and a dielectric factor of the food in accordance with said average weight and said average microwave energy level, identifying the food in accordance with said relative dielectric constant and said dielectric factor of the food, obtaining a cooking time corresponding to said identified food, and controlling cooking of the food for said cooking time.

11. The automatic cooking apparatus as claimed in claim 10, wherein said weight sensing means comprises:

a weight sensor coupled to said turntable means for sensing the weight of the food placed on the turntable;

a weight detection circuit for generating a weight sense signal in accordance with the weight of the food sensed by said weight sensor; and an analog to digital converter for converting said weight sense signal into a digital signal to be input to said control means.

12. The automatic cooking apparatus as claimed in claim 10, wherein said microwave energy level sensing means comprises:

a microwave energy sensor provided within said heating chamber for sensing said microwave energy not absorbed into the food;

a microwave energy detection circuit for generating a microwave energy sense signal in accordance with said microwave energy level sensed by said microwave energy sensor; and an analog to digital converter for converting said microwave energy sense signal into a digital signal to be input to said control means.

* * * * *